March 19, 1968     A. A. LUPINETTI     3,374,481

DIGITAL TARGET GENERATOR TEST SET

Filed Nov. 3, 1966     10 Sheets-Sheet 6

NOTE: ALL Δ INPUTS FROM FIG. 7
ALL OTHER INPUTS FROM FIG. 5

INVENTOR.
ALBERT A. LUPINETTI
BY Harvey S. Boyd
ATTORNEY

March 19, 1968  A. A. LUPINETTI  3,374,481
DIGITAL TARGET GENERATOR TEST SET
Filed Nov. 9, 1966  10 Sheets-Sheet 10

INVENTOR.
ALBERT A. LUPINETTI
BY
Harvey S. Boyd
ATTORNEY 3,374,481
DIGITAL TARGET GENERATOR TEST SET
Albert A. Lupinetti, Northfield, N.J., assignor to the United States of America as represented by the Secretary of the Army and/or the Administrator of the Federal Aviation Agency
Filed Nov. 9, 1966, Ser. No. 593,608
10 Claims. (Cl. 343—17.7)

ABSTRACT OF THE DISCLOSURE

This invention relates to a device for the generation of signals which simulate radar returns initiated by radar or beacon interrogations. By simulating targets, processing equipment designed to handle actual reply information, may be tested under precise calculated conditions.

---

The invention described herein may be manufactured and used by or for the Government for governmental purposes without the payment to me of any royalty thereon.

It is the primary object of this invention to produce a plurality of signals, each signal to represent either the reflection of a radar beam or the reply to a beacon interrogation, and each signal being independently variable as to azimuth, range, and run length.

It is a further object of this invention to reproduce the environmental occurrence of having a target randomly fail to produce a reply signal; that is, to have "misses" occur during the run length period.

It is a further object of this invention to represent the situation where a reply takes the form of a spiral as when a near-synchronous reply occurs.

It is a further object of this invention to represent the situation where a pattern of targets may be represented according to a desired sequence which will repeat itself if the run length permits.

It is a further object of this invention to represent the environmental condition of non-synchronous radar returns or beacon replies, commonly known as "fruit."

Reference is now made to the accompanying drawings wherein.

The reply signals which are to be simulated by the invention, in actuality take one of two forms. Either the signal is a reflection off an object of energy from a radar beam, or the signal is a coded transmission from a code box carried by an aircraft, said signal being triggered by an interrogation from a beacon. The problem to create either signal is the same, as the variable parameters of both signals are identical; namely, azimuth, range, and run length. The difference between a reflection signal from a radar beam and a signal initiated by a beacon interrogation lies not in the azimuth, range and run length parameters, but rather in the variance of intensity of a particular signal during the period of one interrogation. That is, the beacon reply is a coded signal within an interrogation period while a radar reply is merely a non-coded reflection. Since the purpose of this invention is the reproduction of a signal at a predetermined setting of azimuth, range, and run length, the invention has application for simulating both radar and beacon operation. All that would be needed to reproduce beacon operation would be to take a standard code box and have it triggered by the predetermined simulated signal and use the output of the code box in place of the simulated signal.

Figure 1:
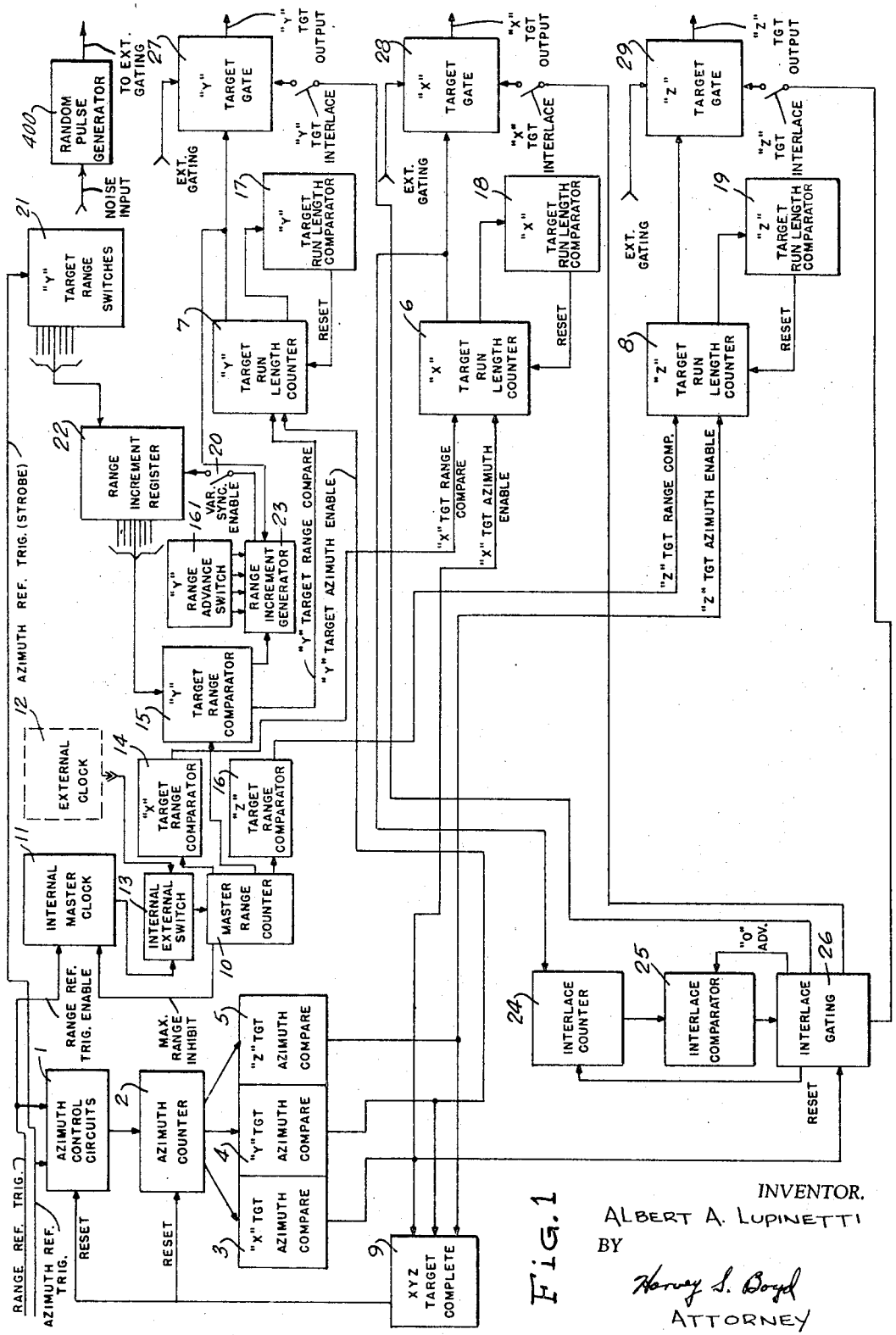
FIG. 1 is a functional block diagram of the digital target generator test set.

The control of the targets in azimuth is accomplished through the use of a four-decade Binary Coded Decimal Azimuth Counter 2, in FIG. 1, and associated control circuitry. Basically what occurs is the dialing-in of a particular number setting on the azimuth switches 3, 4, and 5 of FIG. 1 and 41, 42, 43, 45, 46, 47, 49, 50, 51, 52, 53, and 54 of FIG. 3. This number setting is not calibrated in degrees but rather represents the desired number of interrogations that are to occur to correspond to the desired azimuth setting. Each radar site will vary as to what a particular azimuth switch setting actually represents in degrees, as the numerical switch setting is dependent on the rate of interrogations within a 360-degree scan of the antenna. Using "0" degrees (or "360" degrees) to represent North on a radar scope and going clockwise from that reference point to represent a positive reading of azimuth, to get a desired azimuth reading of 90 degrees, one by knowing the number of interrogations within one 360-degree scan of the antenna, could dial into the azimuth switches the desired number of interrogations which represents, in this case, 90 degrees. By using a Binary Coded Decimal Counter to count the number of interrogations (represented by Range Reference Pulses) per sweep and having the counter compared to the azimuth switch setting, a trigger pulse is generated when the desired azimuth setting is reached, which occurs when the switch setting and the counter agree. Reset circuitry is employed to clear the counter after all desired azimuths corresponding to all the targets to be generated have been reached. This will occur once each 360-degree scan of the radar antenna. In this manner, a desired signal is generated at the desired azimuth setting during each 360-degree scan.

The control of the targets in range is accomplished through the use of a 13-bit Binary Coded Decimal Master Range Counter 10, in FIG. 1, which is continuously incremented by a stable, precise clock so that the contents of the counter represent the round trip time of one radar or one beacon signal. The clock is a crystal controlled oscillator operating at a high frequency. The clock illustrated in this discussion operates at a frequency of 41.4208 mc./s. and is divided by two, five times in count down circuitry so that the least significant bit of the 13-bit counter represents a $\frac{1}{16}$ nautical mile. The inventive concept is not limited to this frequency clock as other high frequency clocks would be acceptable. The counter is enabled by gating the output of the oscillator (before count down) when a Range Reference Pulse is received and is inhibited when a maximum count of $1999\frac{15}{16}$ nautical miles has been detected.

Taking a particular example to better understand the range setting concept, the range switches are dialed to the desired range. In the case of azimuth setting, the number of interrogations per cycle of operation are counted and compared to the switch settings of the desired azimuth. In this manner a trigger signal is released each time the counter compared with the switch setting. The problem with devising a determinable method for the setting of range is having a quantity which has a relation to the range of an object and also could be compared to a switch setting. The problem was solved by the use of a "clock," consisting of a crystal controlled oscillator operating at a very high frequency, as for example 41.4208 mc./s., in which case, by dividing by two, five times in count down circuitry, the least significant bit of the 13-bit counter represents 1/16 nautical mile. The clock is allowed to continually oscillate. At a determined point of time, an interrogation is instituted, the next interrogation does not occur until a finite period of time has elasped. It is in this period of time, that is, between interrogations, that oscillations are used as a unit of measure. By using a clock which oscillates at a high frequency, a high degree of accuracy is achieved. This accuracy is possible because the enabling of the range increments is performed at the oscillator frequency. This minimizes the ambiguity that occurs because the time of enable cannot be synchronized with the continually oscillating clock. The higher the frequency at which the enabling is done, the less time before synchronization is achieved. If the oscillator frequency that represented the 1/16 nautical mile increment was used as the clock, a maximum of one clock period would elapse (1/16 nautical mile) before synchronization is achieved. This would cause a range error of 1/16 nautical mile. This error is reduced to a very small amount with the use of a high frequency clock.

In operations, the range switches are set to represent a particular number of counted down clock oscillations, the correlation between an oscillation and actual nautical mile representation on the scope having been previously determined by knowing the total number of oscillations allowed between interrogations and the total round trip distance each interrogation covers. As an interrogation is initiated, the counted down clock oscillations are fed into a counter. The counter is compared with the range switch settings, and when the two are identical, a trigger pulse is initiated which represents the fact that the desired range has been reached. Reset circuitry is used to clear the counter after every period of interrogation.

The run length, that is, the number of consecutive triggers generated in azimuth for each target, is controlled by two-decade Binary Coded Run Length Counters 6, 7, and 8, in FIG. 1, and the associated run length switches. The Run Length Counter is enabled by a signal from the corresponding azimuth comparator for that target, and is inhibited and reset when the count has reached the numerical setting selected on the run length switches. A signal for gating the range triggers for each target is provided during the interval when the Run Length Counter for that target is enabled. When the target position has been selected, triggers appear at the output of the run length circuitry only during the period that the Run Length Counter is enabled. In actuality, when the desired azimuth is reached by the interrogations, a pulse is generated and the run length counter is activated. During the period that the run length counter is activated, both azimuth and range circuitry are gated so as to permit the successive generation of target pulses for each successive interrogation up until the number of successive interrogations recorded on the run length counter agrees with the run length switch setting at which point the reset circuitry clears the run length counter thus ending the generation of a designated target signal and the cycle is ready to repeat itself during the next 360-degree period of operation.

The invention has the capability of generating a target whose range increases by a selected increment with each trigger that is generated during the period determined by the run length. The incremental increase in range is variable in 1/16 nautical mile steps from 1/16 nautical mile to 15/16 nautical mile and is controlled by a Y Range Advance thumbwheel switch 161, in FIG. 8, and activated by a Y Target Variable Sync lighted, push-button switch 162, in FIG. 8. For example, if the selected azimuth is at 1174, the selected range at 58 1/16 nautical miles, the Y Range Advance at 3/16 nautical mile and the Y Target Variable Sync is activated, the first output trigger signal will occur at 58 1/16 nautical miles and at an azimuth of 1174, the second output trigger signal of 58 4/16 nautical miles and at an azimuth of 1175, the third output trigger signal at 58 7/16 nautical miles and at an azimuth of 1176, etc., until the desired run length setting is achieved. Thus the representation of a target taking a spiral form, which occurs in actuality when near-synchronous radar returns or beacon replies are received, is able to be simulated. This type of target has not previously been simulated by the prior art equipment. The spiral simulation is achieved by having the Range Increment Register 163, in FIG. 7, advance by the amount selected on the "Y" Range Advance switch each time a "Y" target trigger is generated in the run length circuitry. The starting range and azimuth and the run length of the "Y" target are not affected by activating this feature.

The discussions and drawings are based upon a machine with the capabilities of generating three separate targets, each with independently variable ranges, azimuths, and run lengths. Of the three targets which can be reproduced, namely, the "X" target, the "Y" target, and the "Z" target, the "Y" target has the capability of reproducing the spiral representation to simulate the receiving of near-synchronous returns or replies. It should be understood that the invention is not limited to the case of simulating three targets, one of which may simulate the near-synchronous situation, but rather it is within the inventive concept of this simulator to be capable of simulating any number of targets, any number of which may simulate the near-synchronous situation. All that is necessary to vary the number and types of targets is to add or delete the particular circuitry needed to achieve the particular function.

Attention in detail is now drawn to the drawings. FIG. 1 is a block diagram of the simulator in which three targets, "X," "Y," and "Z" may be simulated. The "Y" has the capability of depicting the spiral representation of a near-synchronous pick up. An azimuth reference pulse enters block 1, the azimuth control circuits. Here the pulse is given the correct voltage level for the logic circuitry and is then fed into block 2, the azimuth counter. Here each pulse is counted and the result is fed to blocks 3, 4, 5, the "X" target, the "Y" target, and the "Z" target compare circuits. When the azimuth counter compares with the switch settings in the "X" target azimuth compare circuits, a pulse is gated to the "X" target run length counter, block 6. When the azimuth counter compares with the switch settings in the "Y" target azimuth compare circuits, a pulse is gated to the "Y" target run length counter, block 7. When the azimuth counter compares with the switch settings in the "Z" target azimuth compare circuits, a pulse is gated to the "Z" target run length counter, block 8. Block 9 represents the reset circuitry which resets azimuth counter 2 and azimuth control circuits 1 after each cycle of operation; namely the generation of "X" target, "Y" target, and "Z" target pulses.

Block 10 represents the master range counter. The counter counts the oscillations of either internal master clock 11 or external clock 12 depending on the setting of internal-external switch 13.

The master range counter 10 counts the counted down clock oscillations and continually compares the number of oscillations to the switch settings of the "X" target range comparator 14, the "Y" target range comparator 15, and the "Z" target range comparator 16. The "Maximum Range Inhibit" between 10 and 11 represents the fact that when the master range counter 10 counts the number of oscillations which represent the period of time between interrogations, that is, azimuth reference triggers, the clock oscillations are blocked out for a minute period of time to enable the master range counter to be reset and stabilized for the next cycle of operation.

When the master range counter 10 compares with the switch settings of the "X" target range comparator, a pulse is gated to the "X" target run length counter 6. When the master range counter 10 compares with the switch settings of the "Z" target range comparator, a pulse is gated to the "Z" target run length counter 8. And when the master range counter 10 compares with the switch settings of the "Y" target range comparator, a pulse is gated to the "Y" target run length counter 7.

The "Y" target run length counter 7 permits the generation of a "Y" target output until the counter agrees with the switch setting on the "Y" target comparator 17 at which time the "Y" target run length counter is reset ending the generation of the "Y" target output. The "X" target run length counter 6 permits the generation of an "X" target output until the counter agrees with switch setting on the "X" target comparator 18 at which time the "X" target run length counter is reset ending the generation of the "X" target output. The "Z" target run length counter 8 permits the generation of a "Z" target output until the counter agrees with the switch setting on the "Z" target comparator 19 at which time the "Z" target run length counter is reset ending the generation of the "Z" target output.

The "Y" target is capable of generating a spiral signal. This is accomplished by closing the variable sync enable switch 20. A range increment generator 23 advances the range increment register 22 by the amount selected on the "Y" range advance switch 161 each time a "Y" target trigger is generated in the run length circuitry. Thus each successive "Y" target output pulse has a range increase equal to the switch settings of switch 161.

The interlace function of the machine is accomplished by the use of an interlace counter 24, an interlace comparator 25 and an interlace gating circuit 26. The function of the interlace function is to reproduce the situation in which beacon interrogation of an aircraft produce on successive interrogation periods a variety of coded replies. This simulation is accomplished by the machine employing the interlace feature. Each target is given the same azimuth, range, and run length switch settings. If nothing more was done, you would have each "X," "Y," and "Z" target output pulses appearing more or less as one dot. What the interlace feature does is to selectively block, according to switch settings, two of the three target pulses for a particular interrogation period. Thus a selected pattern of varied combinations of targets is generated. When these varied pulses are used to trigger different beacon codes, the situation of simulating beacon interrogation in which each successive interrogation period may produce a successive pattern of varied coded replies is achieved. In operation, the range triggers for each target are gated from the run length circuitry in accordance with four interlace ratio thumbwheel switches. The switches correspond to an X:Y:X:Z relationship. Any ratio in any combination from 0:0:0:0 to 9:9:9:9 can be produced with this configuration. For example, when a ratio of 2:1:2:3 is selected as the pattern of targets, two "X" target output pulses are produced, then one "Y" target output pulse is produced, then two more "X" target output pulses are produced, then three "Z" target output pulses are produced in succession and the pattern repeated as long as the run length period permits. The "X" target position switches (i.e., the range, azimuth, and run length switches) determine when the interlace pattern will be initiated and completed "X" target range triggers gated by the run length circuitry are counted in a single 4-bit interlace counter 24 which, in turn, is compared by the interlace comparator 25 with the numerical setting on each one of the interlace ratio switches. Interlace gating circuitry represented by block 26 provides the correct sequence as determined by the interlace ratio switches. When any one of the interlace ratio switches is set to zero, this indicates that no output pulses are to be produced for this particular target. Thus, a "0" advance signal is generated by the circuit 26 which permits the interlace function to switch to the next target to continue the desired sequence. The interlace gating circuit 26 applies the gating signals to the respective "Y" target gate 27 "X" target gate 29, and "Z" target gate 29 provided that the enabling switch to the respective target gate is closed. An external gating signal can also be applied to each of the target gate circuits as for example from random pulse generator 400 having a noise input. This provides for the external enabling or inhibiting of each target output in a random pattern or in a specific pattern with use of a different external input.

Figure 2:
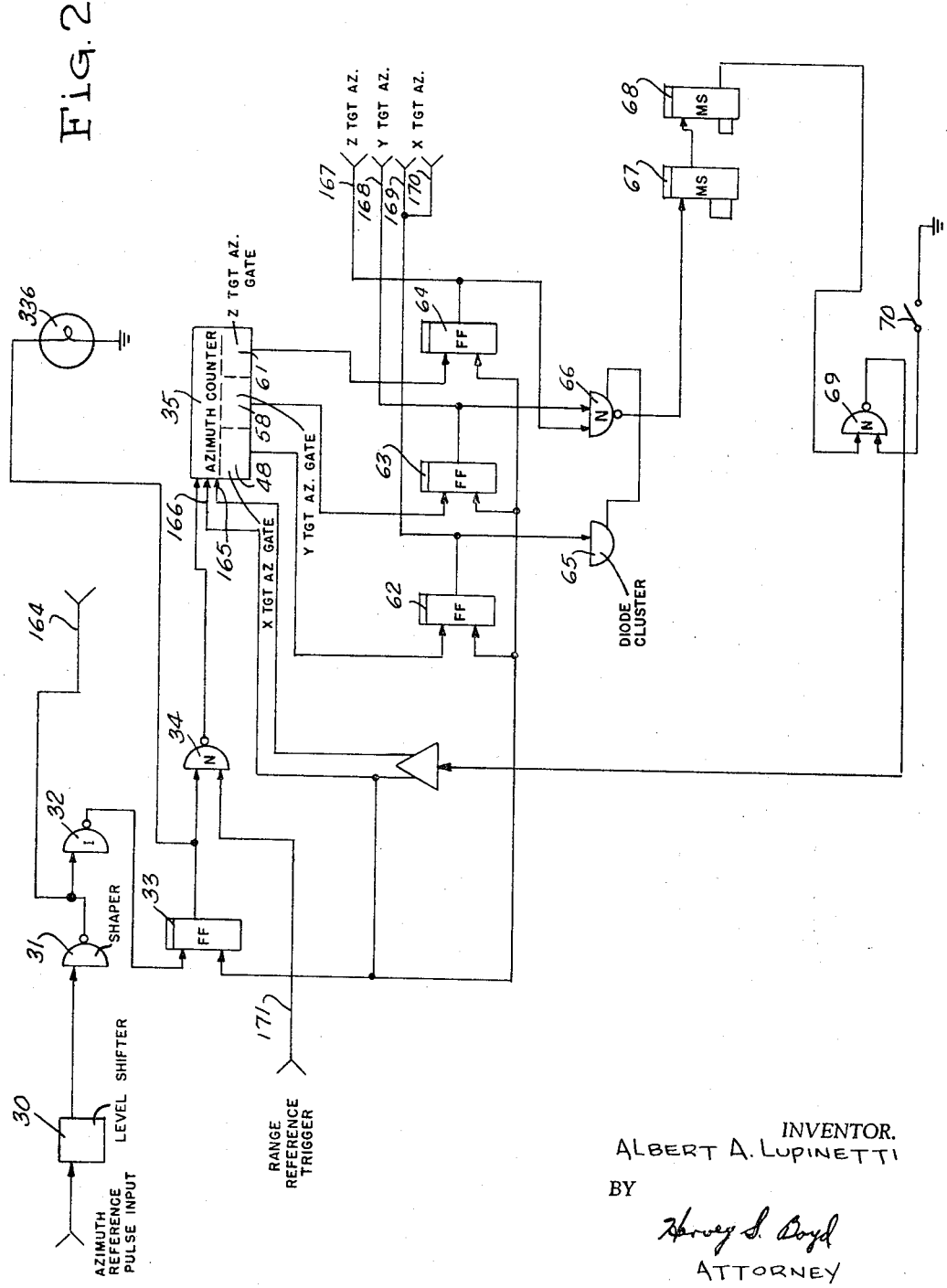
FIG. 2 is a diagram of the azimuth counter control.

FIG. 2 is the diagram for the azimuth control circuits 1, the azimuth counter 2 and the XYZ target complete 9 of FIG. 1. An azimuth reference pulse which occurs once per scan enters level shifter 30 which converts the signal to the logic levels of the machine; namely, 0 and —6 volts. The reference pulse is shaped to standard amplitude, rise time and decay time by gate 31 and inverted by gate 32 for use in setting previously reset flip-flop 33. Flip-flop 33 provides an enable signal to NAND gate 34 so that range reference triggers entering at 171 can be counted by azimuth counter 35 for the beginning of a new 360-degree cycle. The azimuth reference pulse which occurs once each 360-degree cycle simply acts as a zero azimuth starting point.

Figure 4:
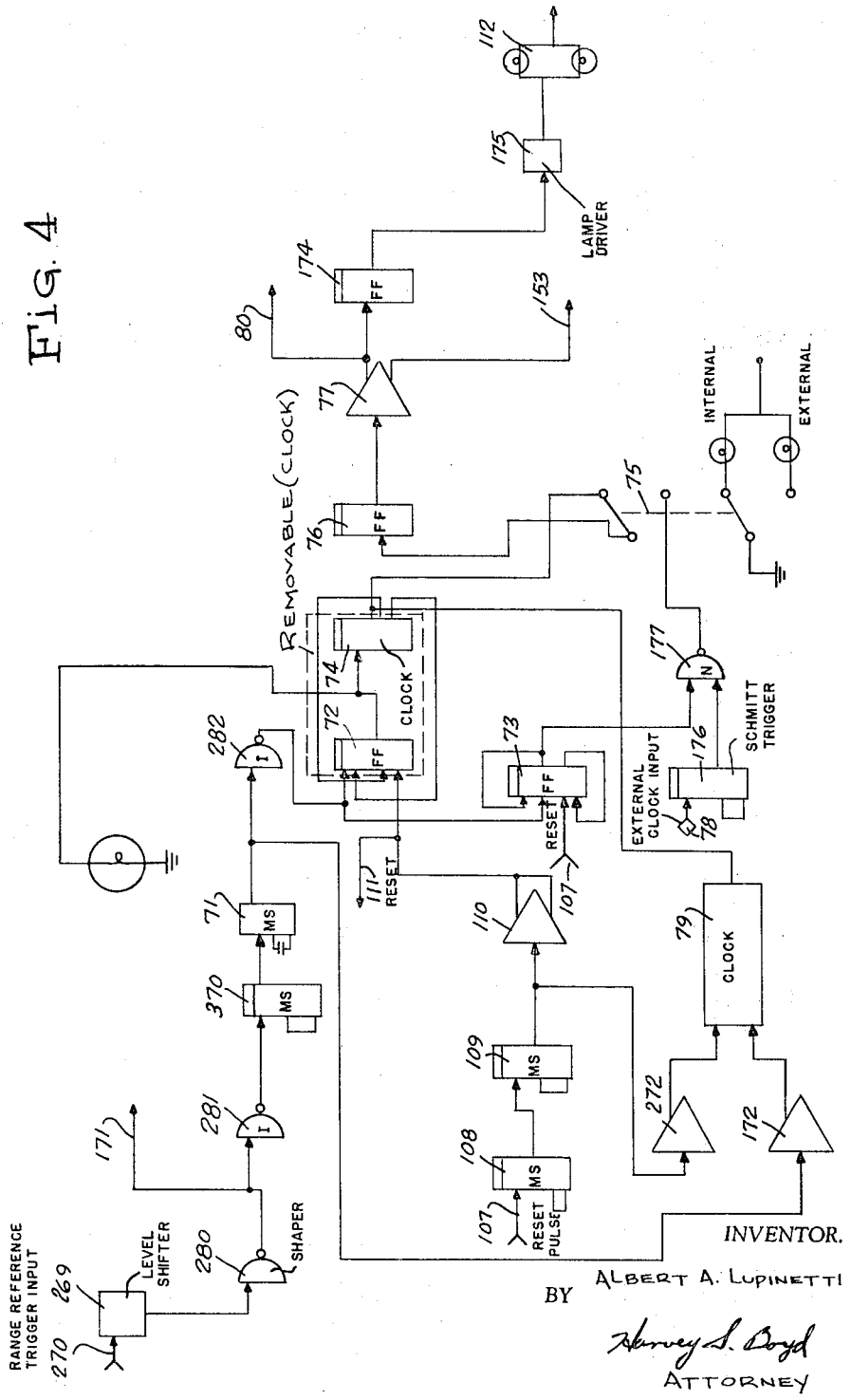
FIG. 4 is a diagram of the master clock and range reference trigger input.
Figure 7:
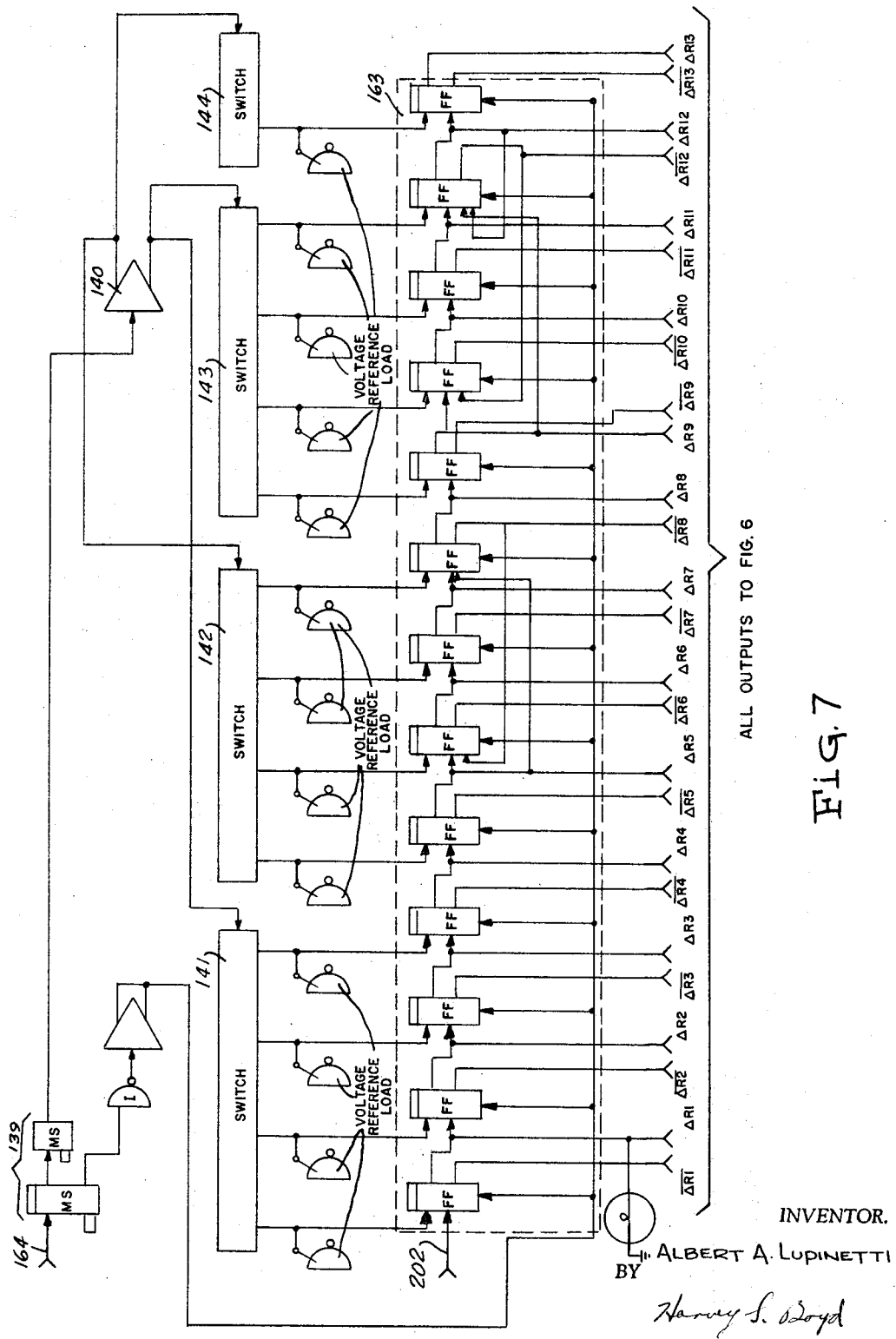
FIG. 7 is a diagram of the range increment counter.

The range reference trigger at point 171, in FIG. 2, originates at point 171, in FIG. 4. Azimuth reference light 336 illuminates whenever an azimuth reference pulse is fed into azimuth counter 35. Point 164 of FIG. 2 and point 164 of FIG. 7 are one in the same. It is the azimuth reference pulse which strobes the "Y" target range switches setting into the range increment register for use in comparison with the master range counter.

Figure 3:
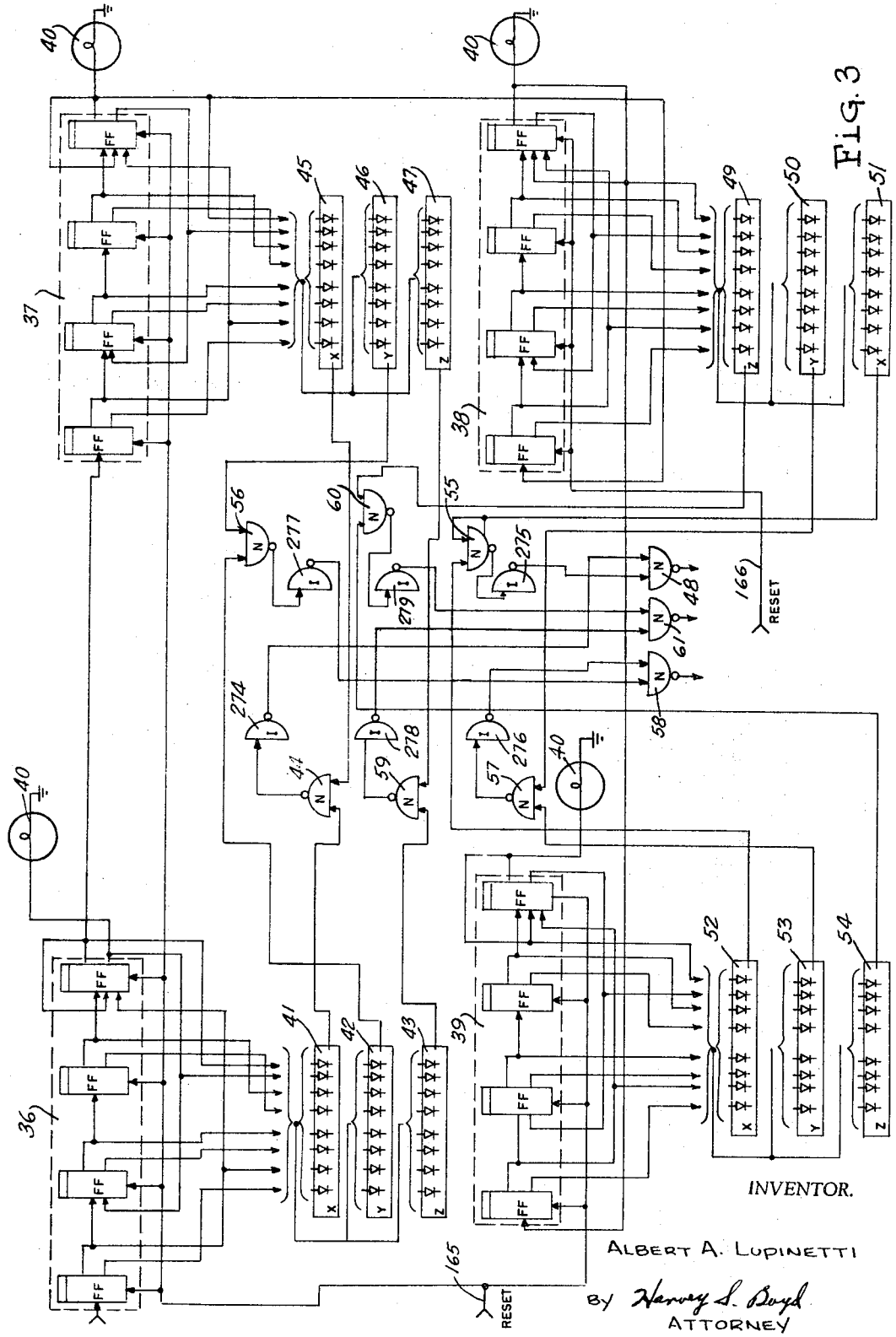
FIG. 3 is a diagram of the azimuth counter.

FIG. 3 is a detailed diagram of azimuth counter 35 of FIG. 2 including the azimuth gates. The counter is designed around four binary coded decimal counter packs 36, 37, 38 and 39. Each counter pack consists of four flip-flops with appropriate inputs for operation as a BCD counter. Counter pack 36 counts the unit digit and will "carry over" to counter pack 37 which counts the tens digit. Counter 37 will "carry over" to counter pack 38 the hundreds counter, and 38 will "carry over" to 39 the thousands counter. Thus a maximum count of 9,999 is obtainable. Indicator lights 40 illuminate during the time in which the respective counters are activated. Each counter pack in this embodiment of the invention is compared to 3 separate azimuth switch settings, each switch representing either the "X" target, the "Y" target, or the "Z" target. Thus, there are three separate unit switches, 41, 42, and 43 for each digit, to which counter 36 is compared. When a comparison results in a matching, taking the "X" target as an example, a pulse is fed to a two input NAND gate 44. Before gate 44 will allow the passage of a pulse, a pulse from the tens switches signifying a comparison between switches 45 and the tens counter 37 for the "X" target must be generated. Once the units counter and the tens counter agree with their respective switch settings for a particular target, gate 44 allows the passage of a pulse to gate 48, also a two input NAND gate. Gate 274 acts as an inverter for the comparison pulse so that it is the correct polarity for application to gate 48. In a similar manner, the hundreds counter 38 and the thousands counter 39 are compared to their respective switch settings, 49, 50, 51, 52, 53, and 54; and through a similar two input NAND gate 55, a pulse is fed to gate 48 when the hundreds and thousands counters agree with the respective "X" target switch settings. Gate 275 acts as an inverter for the comparison pulse so that it is the correct polarity for application to gate 48. When all four counters agree with their respective "X" target switch settings, gate 48 passes a pulse which represents the desired "X" target azimuth setting. In a like manner, "Y" target and "Z" target azimuth pulses are generated using gates 56, 277, 57, 276, and 58, and gates 59, 278, 60, 279, and 61 respectively.

Referring back to FIG. 2, the "X" target azimuth pulse, the "Y" target azimuth pulse, and the "Z" target azimuth pulse each activate flip-flops 62, 63, and 64. When all three flip-flops have been set, gates 65 and 66 pass a signal through multivibrators 67 and 68. The signal is delayed to allow the system to stabilize and is gated through 69. This signal resets azimuth counter 35, by passing reset pulses to points 165 and 166 of FIG. 3 and resets flip-flops 62, 63, 64, and 33. The system is now ready for the next cycle of operation; that is, the next 360-degree cycle of interrogations which will begin when the next azimuth reference pulse occurs. A manual reset switch 70 is employed for the added convenience of hastening a resetting when desired.

Figure 9:
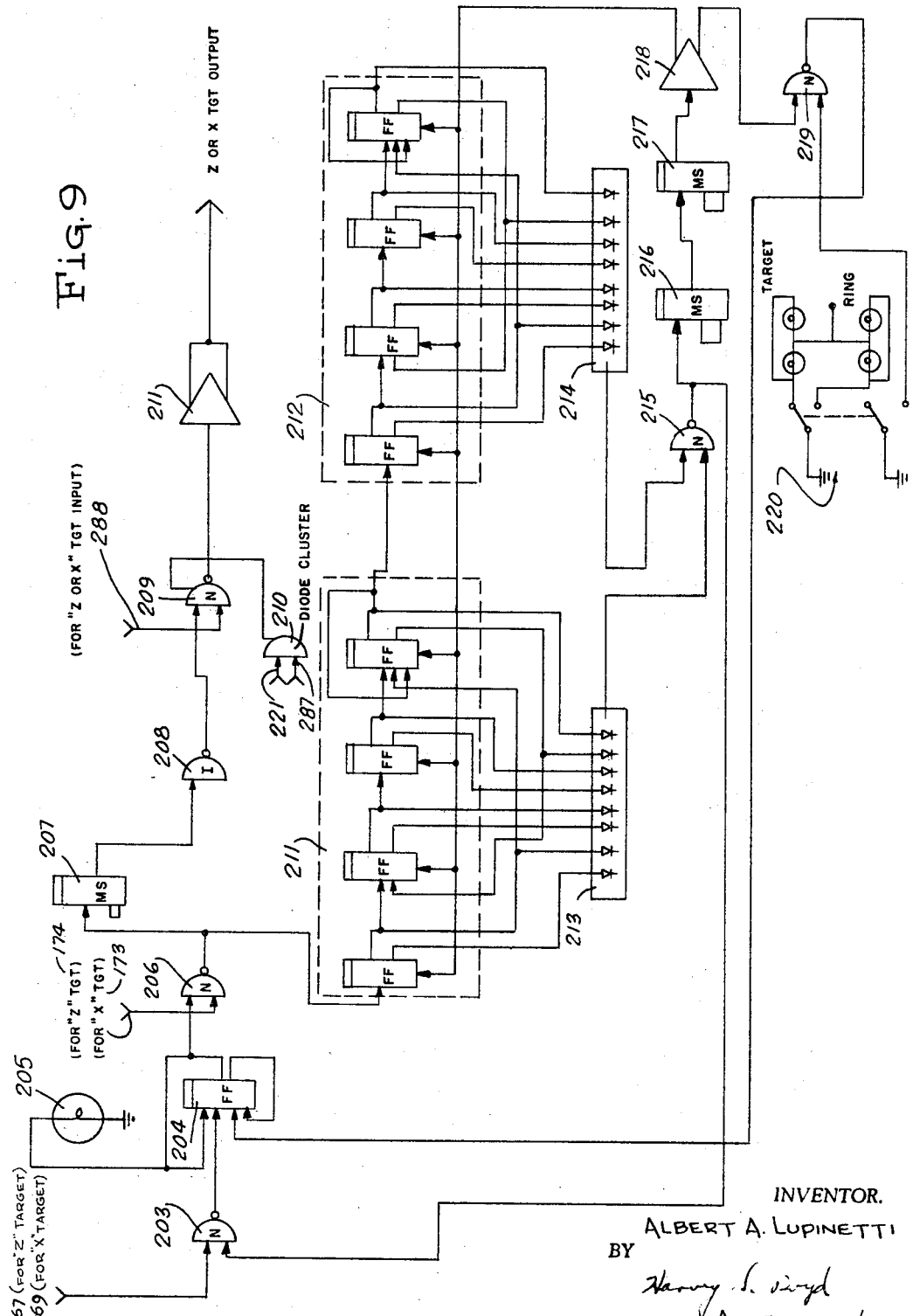
FIG. 9 is a diagram of the "Z" target or the "X" target run length counter.

Point 167 in FIG. 2 is the "Z" target azimuth output signal. This signal is the input signal at point 167 of the "Z" target run length counter in FIG. 9. It should be remembered that FIG. 9 represents the circuitry not only for the "X" target run length counter but is also the circuitry for the "Z" target run length counter. Thus, for the "Z" target, the run length function, when it is employed, is triggered by the "Z" target azimuth signal.

Point 169 in FIG. 2 is the "X" target azimuth output signal. This signal is the input signal at point 169 of the "X" target run length counter in FIG. 9. Thus for the "X" target, the run length function, when it is employed, is triggered by the "X" target azimuth signal.

Point 170 in FIG. 2 is another outlet of the "X" target azimuth output signal. This signal is the input signal at point 170 of the interlace counter and comparator in FIG. 10.

Point 168, in FIG. 2, is the "Y" target azimuth output signal. This signal is the input signal at point 168 of the "Y" target hit counter and range increment generator in FIG. 8.

FIG. 4 is a diagram of internal master clock 11, external clock 12 and internal-external switch 13 of FIG. 1. A range reference trigger pulse 270 enters level shifter 269. Level shifter 269 converts the trigger pulse to the logic level voltage of the machine; namely 0 and —6 volts. The trigger then passes through two gates, 280 for shaping and 281 for inversion, and then to multivibrators 370 and 71 where the pulse is delayed and shaped so as to synchronize the starting of the clock with the beginning of an interrogation pulse period.

The pulse is then passed through power amplifier 172 to provide an enable signal for the 41.4208 mc./s. crystal controlled oscillator of clock 79. Clock 79 provides for a divide by two function for the continuously oscillating 41.4208 mc./s. signal. This is done four times with the clock 79 circuit and once more by flip-flop 76 after switching by switch 75. The counted down clock output of 76 represents $\frac{1}{16}$ nautical mile increments which are power amplified by 77.

The output from amplifier 77 appears at three points. Point 80 represents the clock oscillation pulses and appears at point 80 in FIG. 5 as the input to the master range counter. Point 153 also represents the clock oscillation pulses and appears at point 153 in FIG. 8 as an input to the range increment generator portion of the diagram. The third output enters multivibrator 174 which generates a series of wide pulses which are passed on to lamp driver 175 and finally to clock indicator lamps 112 which indicate that the clock increments are being generated.

The range reference pulse is passed through gate 282 for inversion and fed into gated flip-flop 73. Flip-flop 73 controls the passage of external clock pulses at gate 177 in the same way that the internal clock is controlled. Switch 75, when thrown to the "external" setting, permits the use of an external clock represented by block 78. This feature is desirable as some equipment under test have their own clocking devices which can then be used to achieve exact synchronization. Schmitt trigger circuit 176 acts as a level standardizer for logic levels.

Provision is also made for the use of a back-up clock 74. Clock 74, in this embodiment of the invention is a 2.589 mc./s. clock. The signal which enables clock 74 is taken after the signal passes through multivibrator 71 and inverted for application to gated flip-flop 72 which in turn enables clock 74. The output of clock 74 is also switched by switch 75 and divided by two by flip-flop 76 to represent $\frac{1}{16}$ nautical mile increments. Interconnecting feedback circuits are provided between elements 72 and 74 for gating the clock output between the occurrence of pulses. This eliminates the possibility of enabling and inhibiting the clock during the time that an output pulse is being produced. This is accomplished by feeding back the clock output of element 74 to flip-flop 72 and gating this signal with both the clock start and stop signals. It should be pointed out that clock 79 and clock 74 do not operate simultaneously. Even though their outputs are common, only one circuit would be present. The other would be removed from the machine.

Figure 5:
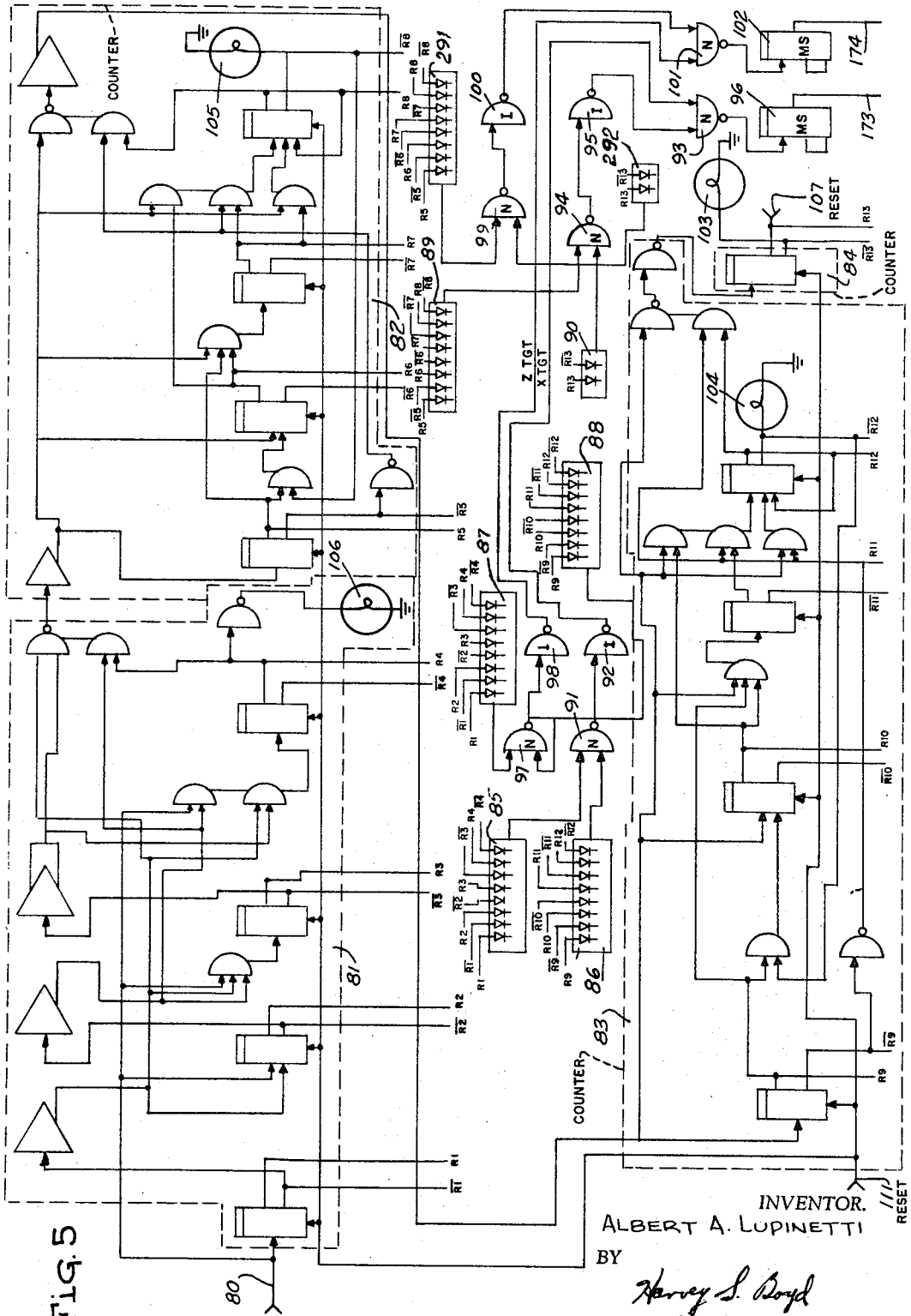
FIG. 5 is a diagram of the master range counter.

The clock output at point 80 in FIG. 4 is the input at point 80 of the master range counter diagrammed in FIG. 5 which under this embodiment of the invention controls the "X" and "Z" targets as to range. The input is fed into a four stage counter. The elements within the counter blocks represents standard counter configurations similar to that described in the "Instruction Manual For 5–MC S–PAC Digital Modules," Publication No. 71–106A, published December 14, 1962, by Computer Control Co. Inc. The first stage 81 counts up to 16 and represents the fact that a $\frac{1}{16}$ nautical mile is the basic unit of measure for range. The second stage of the counter 82 counts units, the third stage of the counter 83 counts tens, and the fourth stage of the counter 84 counts hundreds but only to 1. Thus the maximum count, which is thus the maximum range for the generated targets is $199\frac{15}{16}$ nautical miles. Each stage of the counter is compared to the target range switches that correspond to that particular digit. The first stage of counter 81 which counts the $\frac{1}{16}$ digit is compared to, taking the "X" target as an example, the "X" target switches 85 for the $\frac{1}{16}$ th digit. When the comparison results in identical digits, a signal is generated. That is, when an individual switch is dialed to a particular digit, a diode gate is formed within the switch. When the contents of the counter are such that the binary representation of the selected digit is present, all of the inputs are present at the gate input. An output signal is thus produced from the switch diode gate indicating comparison. The same is true with the units stage 82 of the counter and its corresponding "X" target switches 89; the tens stage 83 of the counter and its corresponding "X" target switches 86; and the hundreds stage 84 of the counter and its corresponding "X" target switches 90. Through gates 91, 92, 93, 94, and 95, a signal is passed to multivibrator 96 where the pulse is delayed and shaped. As a result, an "X" target pulse is only generated when all the switch settings agree with their respective counter stages.

A "Z" target pulse is generated in the same manner. Switches 87, 88, 291, and 292 correspond to the desired "Z" target settings. Gates 97, 98, 99, 100, and 101 allow a pulse to pass to multivibrator 102 where the pulse is delayed and shaped. Thus, a "Z" target pulse is only generated when all the switch settings agree with their respective counter stages. Point 173 represents the "X" target range counter output signal and is represented as point 173 in FIG. 9. Point 174, in FIG. 5, represents the "Z" target range counter output signal and is represented as point 174 in FIG. 9. It should be remembered that FIG. 9 represents the design of the run length circuitry for both the "X" target and the "Z" target and that reference to FIG. 9 when speaking of the "X" target and the "Z" target is not meant to convey the idea that the one circuit controls both the "X" and the "Z" run lengths. 103, 104, 105, and 106, are all lights which illuminate whenever their respective stage of the counter is activated.

Point 107 in FIG. 5 represents the point of generation of a reset pulse every time the 199¹⁵⁄₁₆ point of counting is reached. When counter 84 is set indicating that the 100 nautical mile range has been reached, a reset is not generated since the polarity of signal transition is not correct. When counter 84 is reset indicating that 199¹⁵⁄₁₆ nautical mile range has been reached, the polarity of signal transition at 107 is correct to trigger both 108 and 73 of FIG. 4. Point 107 in FIG. 4 appears at two points, namely, at multivibrator 108 and at gated flip-flop 73 and represents the reset signal generated when the counter has reached its maximum. The pulse is fed through multivibrators 108 and 109 where the reset pulse is delayed and shaped. The reset pulse is picked up at multivibrator 109 and fed through amplifier 272 and into the stop portion of clock 79. Thus the blocking of clock pulses is achieved so as to allow the resetting of the master range counter until the next range reference trigger from level shifter 69 is received.

When back-up clock 74 is used, the reset pulse is amplified by amplifier 110 and sent to gated flip-flop 72 changing its state and thus preventing the transmission of the back-up clock pulses to clock 74 until the next radar trigger from level shifter 269 is received. At point 111 the reset pulse is picked up and enters the master range counter, FIG. 5, at point 111 and resets the all stages of the counter.

When external clock 78 is used, switch 75 is thrown to the "external" setting. The external clock signals are fed into "Schmitt Trigger" circuitry 176 which will shape and shift the signal levels of the external clock input. The signal is then fed into gate 177. The range reference trigger input at level shifter 269 also sets gated flip-flop 73. The output from 73 also enters gate 177. When both signals appear, NAND gate 177 allows a signal to pass which then appears at points 80, 174, and 153 as when the internal clocks were used. The reset signal appearing at 107 which changes the state of flip-flop 73 effectuates the blocking of the clock pulses from clock 78 when a reset signal is generated. The blocking is achieved by gate 177 in that when the state of flip-flop 73 is changed, both pulses fail to appear at gate 177.

Figure 6:
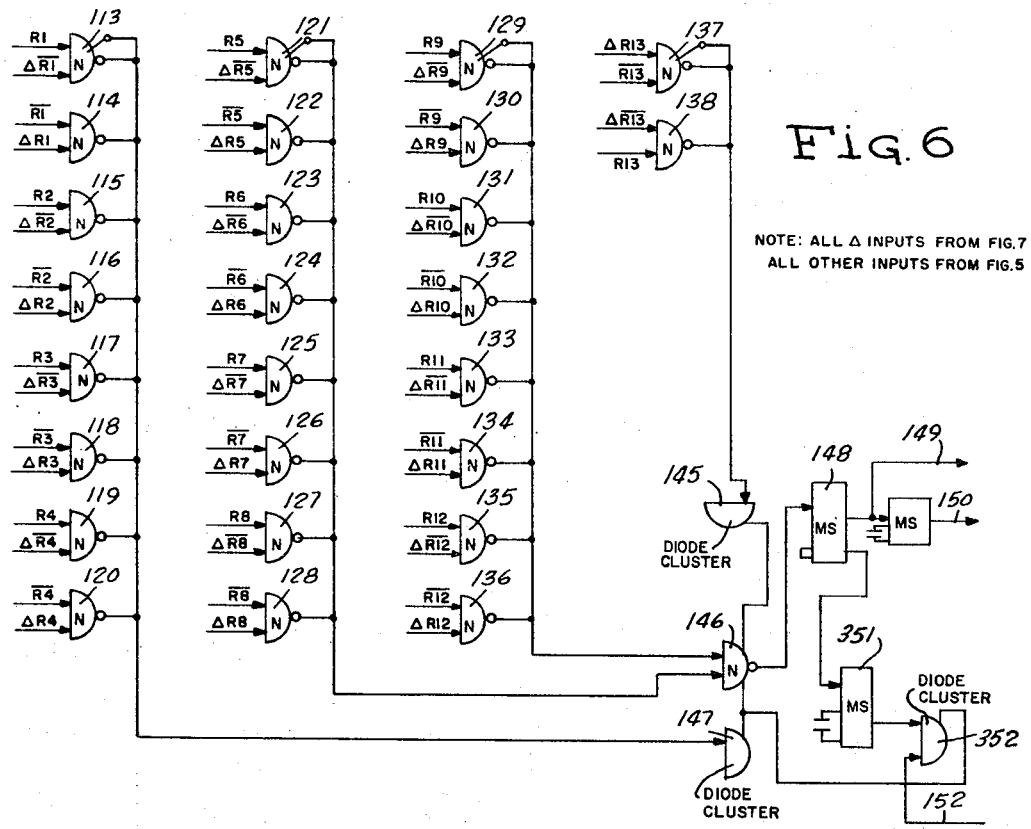
FIG. 6 is a diagram of the "Y" target range comparator.

FIG. 6 is a diagram of the "Y" Target Range Comparator 15 of FIG. 1. NAND gates 113, 114, 115, 116, 117, 118, 119, and 120, represent the ¹⁄₁₆ increment comparison stage of the "Y" target comparator. NAND gates 121, 122, 123, 124, 125, 126, 127, and 128, represent the units increment comparison stage of the "Y" target comparator. NAND gates 129, 130, 131, 132, 133, 134, 135, and 136, represent the tens increment comparison stage of the "Y" target comparator. NAND gates 137 and 138 represent the hundreds increment comparison stage of the "Y" target comparator. The above gates by requiring a pulse from its corresponding flip-flop in the master range counter, FIG. 5, and from its corresponding flip-flop in the range increment counter, FIG. 7, before a pulse will be passed, in effect allows a pulse to be generated only when the desired range according to the clock oscillations is reached.

The outputs of each flip-flop of every stage of the master range counter, FIG. 5, are fed into their respective gates of FIG. 6. Thus for a particular count of clock pulses which represents a particular "Y" target range, a particular arangement of gates has one of the two required pulses needed before a signal can be passed by that gate. The second array of signals fed into the gates comes from the appropriate flip-flops of the range increment counter, FIG. 7.

In FIG. 7, the azimuth reference pulse enters multivibrators 139 where it is delayed and shaped. The first monostable multivibrator provides a delay and the second monostable multivibrator is triggered by the trailing edge of the generated pulse to produce a pulse of a particular shape. A reset is first generated from multivibrator 139. It is inverted and amplified and used to reset the entire range increment register 163 once each 360-degree scan. Immediately following the reset, a delayed strobe is generated by multivibrator 139. This strobe is power amplified by 140 and used to activate the appropriate flip-flops of 163 through "Y" target range switches 141, 142, 143, and 144 to correspond to the desired range setting. Voltage reference elements are coupled to the output of switches 141, 142, 143 and 144. The voltage reference elements are required for operation in that for certain conditions, the outputs are connected to an open circuit within the switches. Thus, the range increment register is cleared and updated each 360 degree scan. The flip-flop outputs are fed to their appropriate gates of the "Y" target range comparator, FIG. 6. Thus, as each digit gate receives both signals, it allows a pulse to pass. With the use of gates 145, 146, and 147, a pulse is passed only when each digit of the "Y" target range switch settings agrees with the clock increment count. The pulse from gate 146 is delayed and shaped by multivibrator 148. Points 149 and 150 represent separate take offs of the same output except that the signal at 150 is delayed from that at 149 and are fed into the "Y" target hit counter and range increment generator of FIG. 8. A third output is taken from multivibrator 148 of FIG. 6 and is passed through multivibrator 351 where the pulse is stretched. This stretched pulse is fed back through gate 352 to act as a disable signal for gates 145, 146, and 147. That is, the output of gate 352 is connected to a junction of gates 146 and 147 and together with the connection between 145 and 146 causes the gates to function as a single gate such that the inhibit pulse from gate 352 inhibits each of the gates. The purpose of the disable signal is to block any multiple range comparison signals that might occur. An additional lock out signal appears at point 152 from gated flip-flop 179 of FIG. 8.

Figure 8:
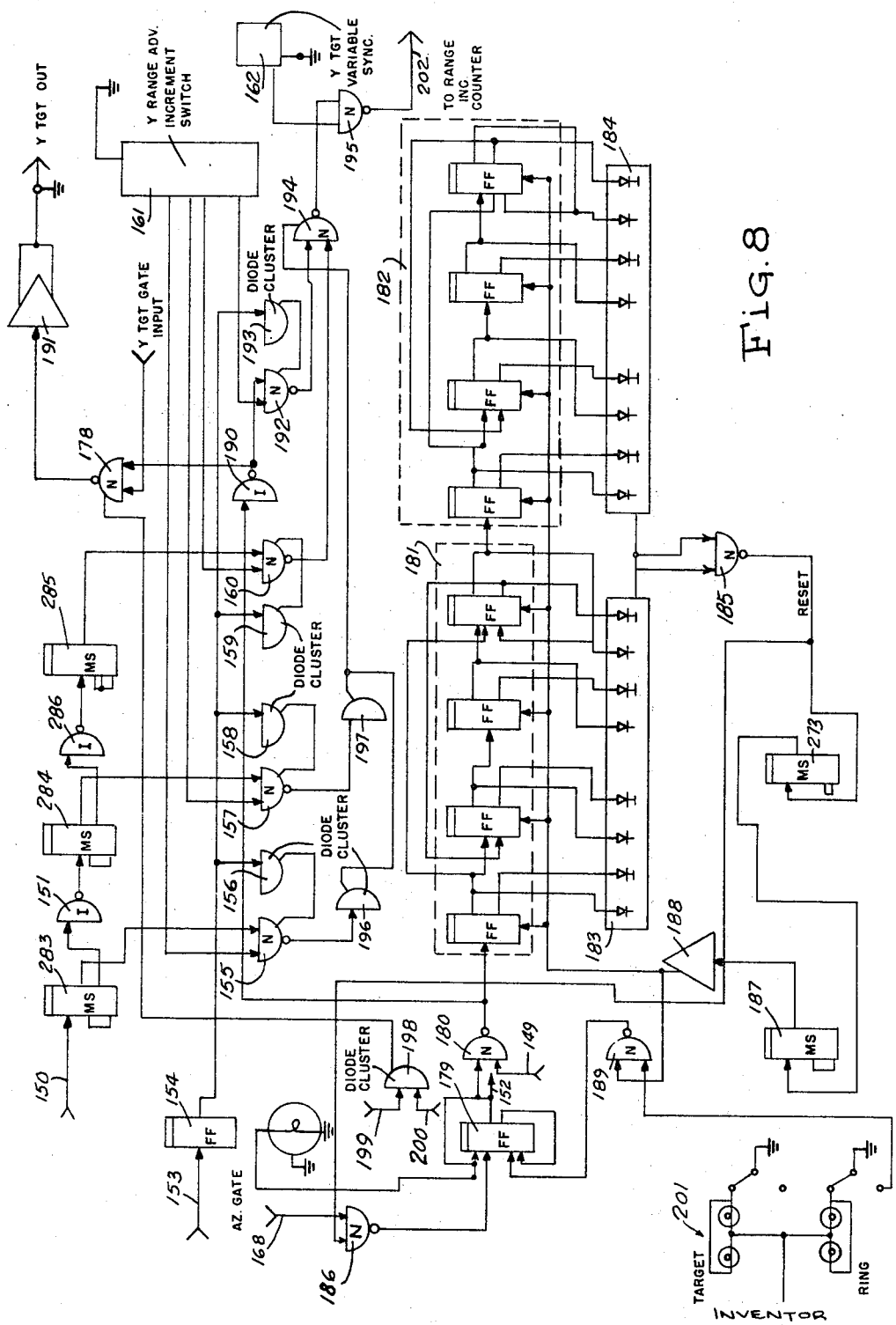
FIG. 8 is a diagram of the "Y" target hit counter and range increment generator.

FIG. 8 is a diagram of Range Increment Generator 23, "Y" Target Run Length Counter 7, "Y" Target Comparator 17, and "Y" Target Gate 27. At point 149, in FIG. 8, the "Y" target range compare signal from point 149, in FIG. 6, appears. This signal represents the fact that the desired "Y" target range, as determined by the clock oscillations, has been reached. At point 168, in FIG. 8, the "Y" target azimuth pulse from point 168, in FIG. 2, appears. This signal represents the fact that the desired "Y" target azimuth has been reached. When the desired azimuth has been reached and the hit counter is in a reset condition indicated by the output of gate 185, a signal is passed on to set gated flip-flop 179. The output signal 152 provides an enable to gate 180 so that the range compare signals at 149 are allowed to pass on to the hit counter 181 and 182 during the desired run length. The signal at 152 also acts as a lock out signal for gates 145, 146, and 147 of FIG. 6 during the desired run length. Thus when both signals appear at gate 180, a pulse is sent into counter 181 and 182, 181 being the units stage of the "Y" run length counter and 182 being the tens stage of the "Y" run length counter.

The output from gate 180 is inverted by gate 190 which passes the signal to gate 178. A "Y" target gate input also e ters gate 178. This input when left unused provides an enable so that the signal from gate 190 is allowed to pass. A second "Y" target gate input at 200 is applied to gate 198 along with the "Y" target interlace enable signal at 199. The output of gate 198 is combined with gate 178 to enable or disable the output of gate 178 depending on the desired function. Here again, if both 199 and 200 are not used, gate 178 is enabled. However, either can control the output when used. The signal is passed to power amplifier 191 where the signal is amplified and becomes the "Y" target output.

A second path for the output from gate 180 is to the run length counter and the reset circuitry. When the counter stages agree with the "Y" target run length switch settings, 183 being the unit switches and 184 being the tens switch, a reset pulse is generated. The reset signal takes two paths after leaving gate 185. One path is to gate 186 to provide an enable when the next azimuth pulse at point 168 is generated. The second path of the reset pulse is to multivibrator 273 to delay the pulse, then to multivibrator 187 to shape the pulse, then to power amplifier 188 to amplify the pulse, and then to a common node where the pulse follows two paths. One path resets the flip-flops of counter stages 181 and 182. The second path goes through gate 189 to gated flip-flop 179 and resets the flip-flop. When flip-flop 179 is reset, gate 180 is disabled so that no more "Y" range compare signals are allowed to pass through gate 180 thus completing the desired number of output pulses corresponding to the "Y" target run length switch setting. As shown, flip-flop 179 is provided with a plurality of feedback loops which serve as level controls for the flip-flop. The feedback loops assure that the flip-flop is set to a desired state before permitting the inputs to change the state thereof.

The next point at which gate 180 will pass a signal is when the pulses at 168 and 149 are generated which is when the next proper azimuth and range for the "Y" target are reached. Thus the desired run length of the "Y" target is achieved as the "Y" target pulses are allowed to be generated until counter stages 181 and 182 and switches 183 and 184 generate a reset pulse.

The operation of the "Y" target hit counter just described is performed when switch 201 is in target position. In this position, an enable signal is placed on gate 189 to allow the reset cycle to occur. The ring position prevents the reset signal from passing through gate 189. Preventing the reset cycle from occurring allows "Y" target output signals to be continuously generated at the selected range for the entire 360 degree scan. Thus the "Y" target run length switch setting is ignored and the generation of a "ring" is achieved.

The next function depicted by FIG. 8 is the range increment generator which provides the ability to represent near-synchronous targets. At point 150, the output from the "Y" target range comparator enters multivibrator 283 where a pulse equal to the length of two clock pulses is generated. The clock pulses which enter at 153 are divided by two by flip-flop 154 and the output of 154 will provide the "Y" range advance increments. The divide by two is done so as to allow more time between pulses for switching functions involving the clock. The clock pulses are applied to gates 156, 158, 160, and 193. Gates 156 and 155 functionally form a single gate. If an enable signal from "Y" range advance switch 161 is present at gate 155, two clock pulses will be allowed at the output of gate 155 when the wide pulse from multivibrator 283 appears. The output of 283 is inverted by gate 151 and the trailing edge of the pulse triggers multivibrator 284. The output of 284 is applied to gate 157 with an enable signal from switch 161. If both signals are present, four clock pulses are allowed through gate 158 and appear at the output of gate 157. The output of multivibrator 284 is inverted by gate 286 and the trailing edge of the pulse triggers multivibrator 285. The output of 285 is applied to gate 160 with an enable signal from 161. If both are present, eight clock pulses are allowed through gate 159 to appear at the output of gate 160. A single pulse enable from the output of gate 180 is inverted by gate 190 and applied to gate 192 with an enable signal from switch 161. If both are present a single clock pulse is allowed through gate 193 to appear at the output of gate 192. The net effect is that whatever enable signals are present from the "Y" range advance switch 161 depending on the switch setting, that number of clock pulses will be allowed to pass the series of gates. All the pulses are combined with gates 196, 197, and 194 to appear at the output of gate 194. This output is in turn applied to gate 195. The other input to gate 195 is an enable signal from the "Y" target variable sync switch 162. If the switch is activated, gate 195 is enabled and the composite of clock pulses appears at 202.

Range Increment Switch 161 is calibrated in 1/16 representing a 1/16 nautical mile. Thus variations from 1/16 to 15/16 of a nautical mile of range may be achieved. When the desired switch setting is made in range increment switch 161, the corresponding combination of gates are activated. The composite signal at 202 is a series of pulses, the number of which equals the number of 1/16 increments determined by the switch settings.

The output at 202, in FIG. 8, appears at point 202, in FIG. 7. This output is fed into register 163 which accumulates the number of pulses adding them to the previously stored range. Thus the recorded "Y" target range in the register's flip-flops is increased by the amount set on "Y" range advance switch 161. The output of each flip-flop is fed to its respective gate in FIG. 6. The "Y" target range comparator of FIG. 6 operates as previously described, all that has changed is that the flip-flop signals of FIG. 7 represent an increase in range. Thus the output from amplifier 191 of FIG. 8, which represents the "Y" target output for the next successive generated "Y" target pulse, is increased by one as to azimuth as compared to the prior "Y" target azimuth pulse but its range has been increased over the prior "Y" target's range by an amount equal to the setting on range increment switch 161. The generation of "Y" targets with successive incremented range increases continues until the counter stages 181 and 182 of FIG. 8 agree with run length switch settings 183 and 184, thus generating a reset pulse which ends "Y" target generation for that sweep of the antenna.

FIG. 9 is a diagram of the "X" or "Z" target run length counter 6 or 8 respectively, the "X" or "Z" target comparator 18 or 19 respectively, and the "X" or "Z" target gate 28 and 29 respectively of FIG. 1. The discussion of FIG. 9 will be based on a discussion of the "X" target run length. It must be remembered that the "Z" target run length function operates in the same manner.

When the desired "X" target azimuth has been reached and the hit counter is in a reset condition indicated by the output of gate 215, a signal is passed on to gated flip-flop 204 from gate 203. The output of 204 provides an enable to gate 206 so that the "X" target range compare signals at 173 are allowed to pass on to the hit counter 211 and 212. Flip-flop 204 is also provided with feedback loops which serve as level controls for changing the state thereof. The counter is designed, in this embodiment of the invention, to count units digits at 211 and tens digits at 212.

Switches 213 and 214 are set to the desired run length count, and when the units counter agrees with the units switch setting, a pulse is generated and fed into gate 215. In the same manner, when the tens counter agrees with the tens switch setting, a pulse is fed into gate 215. When both pulses occur at NAND gate 215, a reset signal is generated. The reset signal is fed back to gate 204 and is also fed into two series multivibrators 216 and 217 where the pulse is delayed and shaped. The pulse is then amplified by amplifier 218 and two signals are sent, one signal is sent to reset the flip-flops of the run length counter while another signal is sent to reset flip-flop 204 to block further passage of range compare signals. Thus a signal is continually generated until the counter agrees with the switch settings at which time reset circuitry changes the state of flip-flop 204, and thus a signal is not allowed to pass gate 206. When the next azimuth signal enters gate 203 the state of flip-flop 204 is again changed thus allowing gate 206 to pass a signal and enable counter 211, 212 and switches 213 and 214 to go through another cycle of operation. The "X" target output signal is taken off after gate 206 and is fed through a multivibrator pulse shaper 207 and passed through a series of gates, 208 for inversion and 209 for output gating functions. Gate 210 combines with 209 to act as a single gate.

The output gating of gates 210 and 209 is similar to the output gating of gates 178 and 198 of FIG. 8. The output from gate 208 is fed into gate 209. A "X" target gate input 288 also enters gate 209. This input when left unused provides an enable so that the signal from gate 208 is allowed to pass. A second "X" target gate input at 287 is applied to gate 210 along with the "X" target interlace enable signal at 221. The output of gate 210 is combined with gate 209 to enable or disable the output of gate 209 depending on the desired function. If both inputs, 221 and 287 are not used, gate 209 is enabled. However, either can control the output from gate 209 when used. The signal is passed to power amplifier 211 where the signal is amplified and becomes the "X" target output.

As discussed earlier, in actuality, a target representation may have holes (missing hits) in its run length for one reason or another. Thus to create a machine which is to simulate radar or beacon replies, the "misses" representation of target generation needs to be duplicated. This "misses" capability is achieved at gates 209 and 210. Random pulse gating at one input can provide the random "misses." Amplifier 211 amplifies the signal from gate 209 and creates the final "X" target output signal.

An added feature of the circuitry is the capability represented by switch 220. When switch 220 is moved from the target position, which operation was described above, to the ring position, the capability of generating a target which appears as a ring on a P.P.I. scope at a certain range is achieved. This switch setting nullifies the reset signal by allowing each azimuth signal to reach gate 206 along with the range signal, thus having a signal generated for every interrogation, resulting in the generation of a ring pattern.

Figure 10:
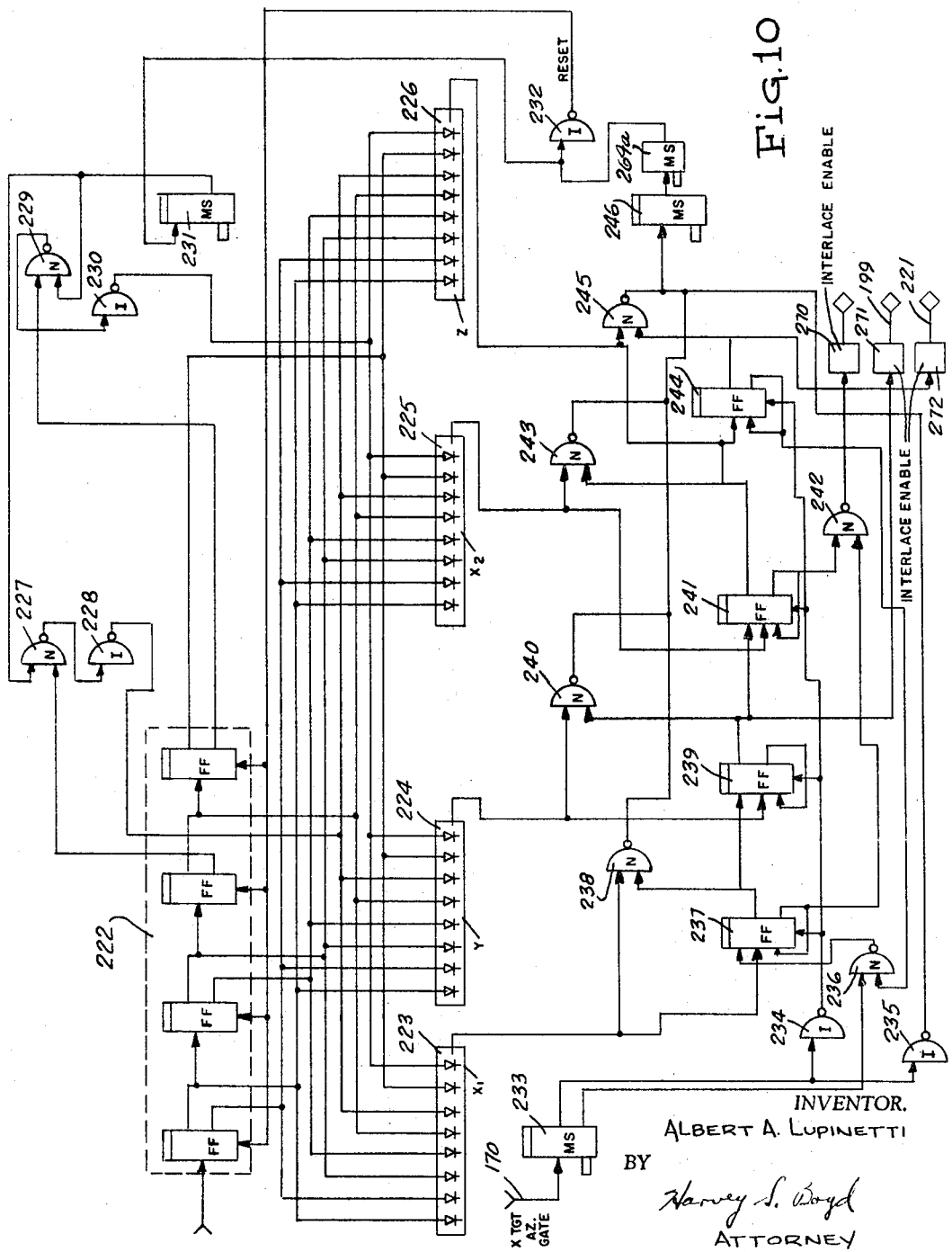
FIG. 10 is a diagram of the interlace counter and comparator.

FIG. 10 is the diagram for the interlace counter 24, the interlace comparator 25, and the interlace gating 26 of FIG. 1. When the desired "X" target azimuth (any of the three targets can be used) has been reached, a signal appears at 170 and triggers multivibrator 233. One output of 233 is inverted by gate 234 and used to reset the interlace storage flip-flops 237, 239, 241, and 244. The output of 233 is also applied through gate 235 to multivibrators 246 and 246a where it is delayed and shaped and a reset pulse is generated which resets the interlace counter 222. Another output is passed through gate 236 and the trailing edge of the signal gated flip-flop 237. The output of 237 is passed through gate 242 and will enable the "X" target output if the "X" interlace gate switch 270 is activated. Thus the interlace counter is reset and the remaining circuitry is in preparation for a cycle of operation. When the "X" target outputs (any of the three targets can be used) occur, they are applied to the input to counter 222. The counter is connected to the mode interlace ratio switches/ comparator 223, 224, 225, and 226. When a comparison occurs between switch 223 and the counter, a signal is generated which together with the output of flip-flop 237 is applied to gate 238. Gate 238 operates in a similar manner to that of gates 240, 243 and 245. That is, the output of 238 triggers multivibrator 230 to generate a reset signal for counter 222 through gate 232. When the reset occurs, the comparison signal for switch 223 disappears. This action causes flip-flop 237 to reset, disabling the "X" target output if switch 270 is activated. The output of multivibrator 246 is also applied to multivibrator 231 which generates a pulse. This pulse is applied to gates 229 and 227 together with the eight bit output and the four bit output of the counters respectively. These signals are inverted by gates 228 and 230 and applied to the interlace switches 223, 224, 225, and 226. This signal lasts for only a short period of time producing a temporary false count in the comparators. The switches cannot each be set higher than 9. The false count is twelve, therefore no comparisons will exist. The purpose for this function is so that if any of the interlace switches is set to zero indicating that the interlace function is to be by-passed for that particular target output, an end of comparison will be generated to reset the flip-flop associated with that switch. It must be remembered that the flip-flops (237, 239, 241, and 244) are reset at the end of comparison. If a switch is set to zero, when the counter 222 is reset, comparison with zero will occur and to provide an end of comparison, the temporary false number is generated.

When flip-flop 237 is reset, it causes flip-flop 239 to be set. Flip-flop 239 now provides an enable signal to the "Y" target output gate through switch 271. The counter 222, having been reset, now counts hits until the contents of the counter compares with the "Y" interlace switch 224. The reset and false count is again generated as previously described and flip-flop 239 is reset and flip-flop 241 is set. At this point the "Y" target output is inhibited and the "X" target output is again enabled through switches 271 and 270 respectively. The process continues enabling the "Z" target output for the number of outputs selected on the "Z" interlace switch. The entire pattern is then repeated and the process continues until the number of "X" target outputs corresponding to the selected run length has occurred.

For the generation of non-synchronous replies commonly known as "fruit," a noise signal is applied to the input of the random pulse generator 400 with the output pulses being selectively applied to the external gating input of the desired target gate. The output pulses may also be applied to a standard code box, and it is the output of the code box which is used to represent the condition of a random distribution of non-synchronous replies; that is, "fruit."

I claim:
1. A target generator test set comprising:
    (a) logic circuit means for generating a first signal selectively variable with respect to a reference point of time and indicative of azimuth;
    (b) logic circuit means for generating a second signal selectively variable with respect to a fixed period of time simultaneously initiated with said first signal and indicative of range; and
    (c) logic circuit means for generating a third signal representative of a simulated target when the first signal and the second signal occur simultaneously.
2. A target generator test set as described in claim 1 wherein said logic circuit means for generating the first signal selectively variable with respect to a reference point of time and indicative of azimuth comprises:
    (a) a plurality of flip-flops arranged so as to constitute a binary coded decimal counter; and
    (b) a plurality of variable switches coordinated with the flip-flops so as to selectively pass a signal indicative of a desired azimuth.
3. A target generator test set as described in claim 1 wherein said logic circuit means for generating the second signal selectively variable with respect to a fixed period of time and indicative of range comprises:
    (a) a high frequency clock;
    (b) gating means for selectively blocking the clock pulses;
    (c) a plurality of flip-flops arranged so as to act as a binary coded counter for the counting of the clock pulses; and
    (d) a plurality of variable switch settings coordinated with the flip-flops so as to selectively pass a signal indicative of a desired range.
4. A target generator test set as described in claim 1 wherein the third signal's output is controlled by circuitry comprising:
    (a) a plurality of flip-flops arranged so as to constitute a binary coded decimal counter;
    (b) a plurality of variable switches coordinated with the flip-flops so as to permit the passage of a target signal until the binary coded decimal counter agrees with the switch settings; and (c) reset circuitry to clear the binary coded decimal counter every time the counter and the switch settings agree.

5. A target generator test set as described in claim 4 further comprising random pulse gating means at the output of the variable switches so as to provide random "misses" within the generation period of the target.

6. A signal return simulator for selectively duplicating a plurality of independent signals which are variable in azimuth and range wherein at least one of the simulated signals is simulated by circuitry comprising:

(a) a first logic regulated circuit means activated by an input pulse;
(b) a first counting circuit means connected to the output of said first logic regulated circuit means;
(c) a plurality of variable azimuth signal comparison switch means connected to said first counting circuit means, said switch means triggering a pulse representative of azimuth upon comparison of the switch settings with the first counting circuit means;
(d) a second logic regulated circuit means activated by an input pulse;
(e) a second counting circuit means connected to the output of said second logic regulated circuit means;
(f) a plurality of variable range signal comparison switch means connected to said second counting circuit means, said switch means triggering a pulse representative of range upon comparison of the switch settings with the second counting circuit means; and
(g) gating means for passing a simulated target signal when both the azimuth generated pulse and the range generated pulse occur simultaneously.

7. A signal return simulator as described in claim 6 wherein the simulated target signal outputs are controlled by circuitry comprising:

(a) a plurality of flip-flops arranged so as to constitute a binary coded decimal counter;
(b) a plurality of variable switch settings coordinated with the flip-flops so as to permit the passage of a target signal until the binary coded decimal counter agrees with the switch settings; and (c) reset circuitry to clear the binary coded decimal counter every time the counter and the switch settings agree.

8. A signal return simulator as described in claim 6 wherein at least one of the simulated signal's simulation circuitry comprises:

(a) a plurality of flip-flops arranged so as to act as a register for the recording and retaining of pulses indicative of range;
(b) a variable range advance switching means capable of updating the range count of the register a predetermined amount; and
(c) gating means capable of gating a pulse indicative of a simulated target every time the outputs from the register and the outputs from the second counting circuit occur simultaneously.

9. A signal return simular as described in claim 8 further comprising:

(a) a plurality of flip-flops arranged so as to act as a binary coded decimal counter;
(b) a plurality of variable switch means coordinated with the flip-flops so as to selectively pass a signal indicative of a desired count; and
(c) reset means capable of having the signal passed by the switch means reset the counter.

10. A signal return simulator as described in claim 9 further comprising:

(a) a plurality of flip-flops arranged so as to constitute a binary coded counter;
(b) a plurality of variable switches coordinated with the flip-flops to selectively pass a signal; and
(c) gating means to selectively activate said switches to produce a desired pattern of varied outputs.

References Cited

UNITED STATES PATENTS

| | | | |
|---|---|---|---|
| 3,313,876 | 4/1967 | Freeborn | 343—17.7 X |
| 3,323,123 | 5/1967 | Hegarty et al. | 343—17.7 |
| 3,357,016 | 12/1967 | Peronneau et al. | 343—17.7 |

RODNEY D. BENNETT, *Primary Examiner.*

T. H. TUBBESING, *Assistant Examiner.*